United States Patent [19]

Verduijn

[11] Patent Number: 5,472,681
[45] Date of Patent: Dec. 5, 1995

[54] FE-CONTAINING ZEOLITE KL

[75] Inventor: Johannes P. Verduijn, Leefdaal, Belgium

[73] Assignee: Exxon Chemical Patents Inc., Linden, N.J.

[21] Appl. No.: 98,365

[22] PCT Filed: Feb. 4, 1992

[86] PCT No.: PCT/EP92/00246

§ 371 Date: Oct. 25, 1993

§ 102(e) Date: Oct. 25, 1993

[87] PCT Pub. No.: WO92/13799

PCT Pub. Date: Aug. 20, 1992

[30] Foreign Application Priority Data

Feb. 8, 1991 [GB] United Kingdom ............... 9102703

[51] Int. Cl.$^6$ ................ C01B 39/06; C01B 39/32; B01J 29/068; C10G 35/085
[52] U.S. Cl. ........... 423/713; 423/716; 423/DIG. 28; 502/66; 502/74; 208/138
[58] Field of Search ............ 423/700, DIG. 28, 423/713, 716; 502/60, 64, 66, 74; 208/137, 138

[56] References Cited

U.S. PATENT DOCUMENTS

| | | | |
|---|---|---|---|
| 4,208,305 | 6/1980 | Kouwenhoven et al. | 423/713 X |
| 4,544,539 | 10/1985 | Wortel | 423/716 X |
| 4,698,322 | 10/1987 | Santilli et al. | 502/74 |
| 4,699,894 | 10/1987 | Santilli et al. | 502/74 |
| 4,701,315 | 10/1987 | Wortel | 423/DIG. 28 X |
| 4,894,214 | 1/1990 | Verduijn et al. | 423/700 |
| 4,956,166 | 9/1990 | Verduijn et al. | 423/DIG. 28 X |
| 5,064,630 | 11/1991 | Verduijn et al. | 423/716 |
| 5,185,138 | 2/1993 | Vaughan | 423/710 |
| 5,242,675 | 9/1993 | Verduijn | 423/700 |
| 5,318,766 | 6/1994 | Vaughan | 423/700 |

FOREIGN PATENT DOCUMENTS

| | | |
|---|---|---|
| 0198721A1 | 10/1986 | European Pat. Off. . |
| 0198720A1 | 10/1986 | European Pat. Off. . |
| 0323893A | 12/1989 | European Pat. Off. . |
| 8002214 | 1/1983 | Japan ............ 423/DIG. 28 |

Primary Examiner—Mark L. Bell
Assistant Examiner—David Sample
Attorney, Agent, or Firm—E. F. Sherer

[57] ABSTRACT

The crystal size and shape of zeolite KL can be improved by forming the zeolite from a synthesis mixture in which the molar ratio of $K_2O/SiO_2$ is 0.18 to 0.36, and in which the synthesis mixture comprises iron preferably in an amount such that the molar ratio of $Fe_2O_3/Al_2O_3$ is 0.015 to 0.3.

23 Claims, 7 Drawing Sheets

FE-CONTAINING ZEOLITE KL

The present invention relates to a zeolite KL containing iron and of improved morphology compared with a zeolite produced from the same synthesis mixture, but not containing iron. The present invention also relates to a process for producing such a zeolite, a reforming catalyst comprising the zeolite, and a reforming process using this catalyst.

The reforming of hydrocarbons, and in particular the aromatisation of paraffins, frequently uses a catalyst comprising a zeolite KL on which has been loaded a metal such as platinum, or a mixture of platinum and another metal, e.g. iridium. The size and shape i.e. the morphology of the zeolite crystals affects the performance of the catalyst. Another factor which contributes to catalyst performance is the overall electronegativity of the zeolite. A reduction in the electronegativity can improve the catalyst performance. Zeolites are commonly formed of an alumino-silicate structure. The electronegativity of this may be reduced by replacing at least a part of the aluminum in this structure with another metal.

It has now surprisingly been found that zeolite EL which has been crystyallized from a synthesis mixture of low alkalinity, conveniently expressed in terms of a ratio of $K_2O/SiO_2$, and containing $Fe^{3+}$ ions shows an enhanced morphology, in particular compared with a zeolite crystallised from the corresponding synthesis mixture which does not contain Fe.

EP-A-198721 and EP-A-198720 (Chevron Research Company) disclose zeolite reforming catalysts comprising platinum metal and at least one promoter metal selected from iron, cobalt and titanium. If the promoter metal is iron, it may be present in the synthesis mixture in an amount of e.g. up to around 1100 ppm of Fe. The exemplified reforming catalysts were obtained from synthesis mixtures containing up to 221 ppm of Fe. However, the iron in these reforming catalysts was used as a promoter for the platinum to be loaded on the zeolite. The alkalinity of the synthesis mixture used and the quantities of iron used, are such that the morphology of the crystals is the same, whether or not iron is present in the synthesis mixture.

SUMMARY OF THE INVENTION

The present invention provides an Fe-containing zeolite KL which has a reduced crystal size and flatter basal planes than the corresponding zeolite which was not synthesised in the presence of added iron, and in particular one in which the zeolite synthesis mixture does not contain iron and has a higher alkalinity.

The present invention provides an Fe-containing zeolite KL obtainable by heating a synthesis mixture comprising a source of $K_2O$, a source of $SiO_2$, a source of $Al_2O_3$ and a source of $Fe^{3+}$, in which the $K_2O/SiO_2$ molar ratio is 0.18 to 0.36 and in which the iron is present in an amount such that the average length of the zeolite crystals produced is not more than 80% of the average length of zeolite crystals produced by heating under the same conditions the corresponding synthesis mixture in the absence of iron.

The present invention also provides a process for reducing the average crystal length of a zeolite comprising including a source of $Fe^{3+}$ in a synthesis mixture comprising a source of $K_2O$, a source of $SiO_2$ and a source of $Al_2O_3$, the $K_2O/SiO_2$ molar ratio being 0.18 to 0.36 and the $Fe^{3+}$ being included in an amount sufficient to reduce the average length of the zeolite crystals.

DETAILED DESCRIPTION OF THE INVENTION

The term "corresponding synthesis mixture" refers to a synthesis mixture which, relative to the iron-containing synthesis mixture, contains the same ingredients in particular the same sources of $K_2O$, $SiO_2$ and $Al_2O_3$, and the same relative molar amounts of these components and of water. Heating "under the same conditions" refers to heating under the same conditions of temperature and time and, if applicable, pressure as the iron-containing mixture is heated.

The Fe-containing zeolite KL of the present invention is preferably an aluminosilicate. However, at least a part of the aluminum may be replaced by another atoms which conforms to the tetrahedral structure (a so-called "T atom") e.g. gallium.

The zeolite crystals are in the shape of a cylinder, preferably a right cylinder where the basal plane is normal to the cylinder axis and in which the basal plane is preferably circular or hexagonal. The crystal size varies, depending on the exact components of the synthesis mixture, and in particular the amount of Fe used.

According to the invention, KL crystals may be produced which are cylindrical in shape and have a ratio of length:diameter of greater than 0.5. The term "cylinder" will be used hereinafter to denote a crystal which has this shape and aspect ratio. To produce such crystals it is preferred that the molar ratio of $K_2O/SiO_2$ in the synthesis mixture is in the range of 0.18 to 0.26, and the range of 0.225 to 0.245 is highly preferred. If the ratio is reduced to well below 0.225 then there is a tendency for the contaminant, zeolite W, to form. If the ratio is increased to much greater than 0.245 and the amounts of the other ingredients such as aluminium remain unaltered, then there is a tendency for the crystals produced to have domed, rough basal planes.

According to the invention KL crystals may be produced which have a platelet shape. The term "platelet" is used to denote crystals which are the shape of cylindrical crystals but have an l/d ratio of 0.5 or less. When it is desired to produce platelet crystals the proportion of $Al_2O_3$ used is decreased by reducing the Al content of the synthesis mixture. Typically a $SiO_2/Al_2O_3$ molar ratio of 8 to 15 is used to produce cylindrical crystals. To produce platelet crystals, this ratio is increased to 15 to 80, more preferably 20 to 40 e.g. around 40. To encourage the formation of flat basal planes and to suppress the formation of amorphous by-products, the alkalinity is increased. For example the $K_2O/SiO_2$ molar ratio may be in the range of 0.25 to 0.36.

In general, when the $K_2O/SiO_2$ molar ratio is in the range of 0.18 to 0.26, e.g. 0.225 to 0.245 the average length of the iron-containing crystals is 1 to 4 microns, and the diameter is 0.5 to 2 microns. This compares with a length of 3 to 5 microns for crystals which were synthesised in the absence of iron. If a higher $K_2O/SiO_2$ ratio e.g. 0.25 to 0.36 is used in combination with low Al content in the synthesis mixture, the crystals have a larger diameter than length, forming so called "platelet" crystals. For example, the crystals length of the iron-containing crystals may be 0.05 to 0.2 microns and the diameter may be 0.5 to 1 microns. This compares with a length of 0.4 microns for crystals which were synthesised in the absence of iron. By "low" Al content is meant that the $Al_2O_3/SiO_2$ ratio is reduced at least 50% compared with a ratio of 1:10, i.e. the $Al_2O_3/SiO_2$ ratio is at most 1:20.

There are two main morphological effects of adding iron to the synthesis mixture;

(i) the average crystals size is decreased i.e. all the linear measurements of the crystal are proportionately decreased compared with crystals synthesised from the same mixture in the absence of iron; and (ii) the basal planes of the crystals are flatter.

The flattening of the basal planes is more pronounced when the $K_2O/SiO_2$ ratio is in the upper range of 0.25 to 0.36, i.e. for platelet crystals.

The flatness of the basal planes in a zeolite KL is believed to be an indication of the intrinsic quality of the crystals. The "length" of a crystal is a measurement of the outer edge of the crystal perpendicular to the basal plane containing the diameter. A measure of flatness is the ratio of height:length, where the height is the longest measurement in the same direction as the length. Thus if the basal plane contains raised steps or terraces the maximum measurement or height of the crystal will be greater than the measurement of the length. If the basal planes are flat, the height:length ratio will be 1. The height:length ratio of crystals should be as close as possible to 1, but a ratio of up to 1.2 may be tolerated. The term "hockeypuck" is used herein to describe the shape of platelet crystals which have flat basal planes i.e. a height::length ratio of about 1.

The zeolite synthesis mixture comprises water, a source of $K_2O$, a source of $SiO_2$, a source of alumina and a source of $Fe^{3+}$ ions.

The source of silica may be solid silica or an aqueous solution of silica. Conveniently, it may be a colloidal silica such as that sold under the trade name LUCOX (E.I. Dupont De Nemours & Co.). However, other forms such as silicates may be used.

The source of aluminum may be an alumina introduced in to the synthesis mixture in the form e.g. of $Al_2O_3.3H_2O$ previously dissolved in alkali. However, it is also possible to introduce aluminum in the form of the metal which is dissolved in alkali.

The source of $K_2O$ is conveniently potassium hydroxide.

The source of $Fe^{3+}$ ions may be any convenient iron compound such as $Fe(NO_3)_3.9H_2O$ or $K_3Fe(CN)_6$.

The ratio of $K_2O$ to $SiO_2$ in the synthesis mixture is 0.18 to 0.36 to give cylindrical crystals, preferably 0.18 to 0.26, more preferably 0.235 to 0.245.

The ratio of $Fe_2O_3/Al_2O_3$ in the synthesis mixture is preferably at least 0.015. In a synthesis mixture for producing cylindrical crystals this ratio is more preferably 0.03 to 0.06. In a synthesis mixture for producing platelet crystals this ratio is more preferably 0.06 to 0.3.

If a divalent cation is also present in the synthesis mixture having a $K_2O/SiO_2$ ratio of 0.25 to 0.36 (i.e. platelet or hockeypuck crystal synthesis mixture) then further improvements may be seen in the size of crystals produced. The divalent cation may be a group Ib metal such as copper, a group II metal, for example magnesium, calcium, barium or zinc, a group IV metal such as lead, or a group VI, VII or VIII metal such as chromium, manganese or nickel. These compounds may be introduced in the form of any convenient compound, for example as an oxide, hydroxide, nitrate or sulfate. Magnesium and barium are preferred cations.

Suitable quantities of divalent cation depend on the particular cation used. The following quantities are given for guidance. If the cation is magnesium then as little as 5 ppm may suffice to produce the advantageous effect on crystal size. For example 5 to 100 ppm, especially 5 to 40 ppm of magnesium are suitable.

On the other hand, if barium is used, then larger amounts of this cation may be necessary to produce the advantageous effect. For example 150 to 400 ppm, preferably around 200 to 250 ppm of barium may be used.

The zeolite may be produced using an adaptation of a conventional zeolite production process. The present invention thus provides a process for producing a Fe-containing zeolite comprising:

(i) forming an aqueous synthesis mixture comprising a source of $K_2O$, a source of $SiO_2$, a source of $Al_2O_3$ and a source of $Fe^{3+}$;

(ii) heating the synthesis mixture to at least 150° C. for a time sufficient to crystallize it.

Typically the synthesis mixture will be prepared in two parts; a first aqueous solution comprising the sources of potassium and alumina, and a second aqueous solution comprising the sources of silica and iron and, if present, divalent cation. The two solutions are mixed thoroughly and heated to a temperature of at least 150° C., preferably 170° to 200° C. The heating should be carried out for a sufficient time for the mixture to crystallise. Suitable crystallisation times will be known to the person of skill in the art, and the synthesis mixture can be tested by taking a spot sample and analysing it. As a guide, heating times of at least 60 hours and typically 80 to 130 hours may be used.

The crystallised mixture may be washed and dried.

The dried zeolite powder may be used to produce a catalyst suitable for a reforming process. Accordingly, the present invention provides a reforming catalyst comprising the zeolite as described above which is loaded with platinum or a mixture of platinum with one or more other metal such as iridium.

The zeolite produced as described above should be strengthened e.g. by forming an extrudate with a binder such as silica. The zeolite is loaded with the promoter metal such as platinum using techniques known in the art.

The present invention also provides a process for reforming a hydrocarbon comprising contacting the hydrocarbon with the reforming catalyst as defined above. The reforming process may be carried out using techniques known the art.

The following Examples illustrate the invention:

EXAMPLE 1

Synthesis of zeolite FeKL from a synthesis mixture with $Fe_2O_3/Al_2O_3$ molar ratio of 0.015.

Synthesis mixture (weight of reactants are given in grams):

(A) Potassium aluminate solution.

| | |
|---|---|
| KOH Pellets (87.3% purity) | 30.16 |
| Al(OH)$_3$ powder (98.6% purity) | 15.80 |
| H$_2$O | 74.74 |

The solution was formed from the above ingredients and was boiled until clear, cooled to room temperature and corrected for lose of water due to boiling.

(B) Iron-containing silica solution

| | |
|---|---|
| Ludox HS-40 | 150.25 |
| Fe(NO$_3$)$_3$.9H$_2$O | 1.2098 |
| H$_2$O | 100.63 |
| Additional H$_2$O | 14.63 |

The Fe$^{3+}$ species was dissolved in a portion of the water. This solution was added to the silica solution. The beaker which contained the Fe$^{3+}$ species was rinsed with the additional water. The resulting yellowish solution was vigorously mixed for 3 minutes.

The potassium aluminate solution was added to the contents of the mixer and the whole was mixed for another 3 minutes. During the mixing the synthesis mixture became dark brown. The solar composition of the synthesis mixture was:

2.35 K$_2$O/0.015 Fe$_2$O$_3$/Al$_2$O$_3$/10 SiO$_2$/160 H$_2$O.

311.88 gr of the synthesis mixture was transferred to a 300 ml stainless steel autoclave. The autoclave was heated up to 175° C. and kept at this temperature for 89 hours. The resulting precipitated product had a white appearance while the mother liquor was colorless. This indicates that at least a large portion of the Fe$^{3+}$-species was incorporated in the product. The product was repeatedly washed with demineralized water to pH 10.3 and subsequently dried for 16 hours at 150° C.

The amount of the recovered product was 47.8 grams. X-ray diffraction (XRD) showed that the product was an excellently crystalline zeolite FeKL slightly contaminated with zeolite-W. Scanning electron micrographs (SEM) showed that product consisted of well-defined crystals with a hexagonal cross section and with remarkably flat basal planes. A SEM micrograph is shown in FIG. 1. The dimensions of the crystallites were: length: 2–4 microns, diameter 1–2 microns, l/d ratio: –2.1. The toluene adsorption was 7.0 wt % (p/po=0.25, T=30° C.).

EXAMPLE 2

Preparation of FeKL from a synthesis mixture with Fe$_2$O$_3$/Al$_2$O$_3$ ratio of 0.030.

A synthesis mixture with a molar composition of 2.35 K$_2$O/0.030 Fe$_2$O$_3$/Al$_2$O$_3$/10 SiO$_2$/160 H$_2$O was prepared as described in Example 1 and crystallized for 85 hours at 175° C. The product was recovered in the same way as above. XRD showed that the product was excellently crystalline and pure zeolite FeKL. SEM showed that the crystals were significantly smaller than those obtained in the Example 1. The crystal dimensions were: Length: 1–2.5 microns, diameter 0.5–1 microns, l/d ratio—2.3. Also in this case the basal planes of the crystals were remarkably flat. A SEM micrograph of the product is given in FIG. 1. The toluene adsorption was: 8.6 wt % (p/po=0.25, T=30° C.).

Analysis showed that the SiO$_2$/Al$_2$O$_3$ ratio was 7.1. A value such as this is consistent with the theory that some of the positions in the zeolite structure which would have been filled with Al have been replaced by Fe.

EXAMPLE 3

Preparation of FeKL from a synthesis mixture with Fe$_2$O$_3$/Al$_2$O$_3$ ratio of 0.06.

A synthesis mixture with a molar composition of: 2.35 K$_2$O/0.060 Fe$_2$O$_3$/Al$_2$O$_3$/10 SiO$_2$/160 H$_2$O was prepared and crystallized for 89 hours at 175° c. XRD showed that the product was zeolite FeKL slightly contaminated with zeolite-W. The crystals had very flat basal planes. The dimensions of the crystals were: length: 1–3.5 microns, diameter 0.5–1 microns, l/d ratio: 13 3. A SEM micrograph of the product is given in FIG. 1. The toluene adsorption was: 7.5 wt % (p/po=0.25, T=30° C.).

REFERENCE EXAMPLE A

Preparation of KL from a synthesis mixture to which no Fe$^{3+}$-species was added.

A synthesis mixture with, except for the addition of Fe$^{3+}$-species, the same molar composition as in Examples 1 to 3 was crystallized for 66 hours at 175° C. XRD showed that the product was zeolite KL contaminated with zeolite-W. SEM micrographs showed that the crystals did not exhibit the remarkable flatness as in the previous experiments in which iron was used. The crystals were also larger. The dimensions of the crystals were: length: 3–5 microns, diameter 1.5–2 microns, l/d ratio: —2. FIG. 1 shows a SEM micrograph of the product. The toluene adsorption was:

8.3 wt % (p/po=0.25, T=30° C.).

Effect of Fe$^{3+}$-species in the synthesis of platelet KL.

EXAMPLE 4

A Fe$^{+3+}$-containing synthesis mixture giving KL crystals with a platelet morphology was crystallized in a 300 ml stainless steel autoclave for 120 hours at 150° C. The molar composition of the synthesis mixture was:

3.20 K$_2$O/0.06 Fe$_2$O$_3$/0.25 Al$_2$O$_3$/10 SiO$_2$/160 H$_2$O.

The product had an excellent XRD-crystallinity and did not contain any crystalline contaminants. SEM showed that the crystals had a platelet morphology, e.g. the length of the crystals was between 0.05 and 0.2 microns, while the diameter was between 0.5 and 1.0 microns. The toluene adsorption was: 9.1 wt % (p/po=0.25, T=30° C.).

REFERENCE EXAMPLE B

Figure 1A:
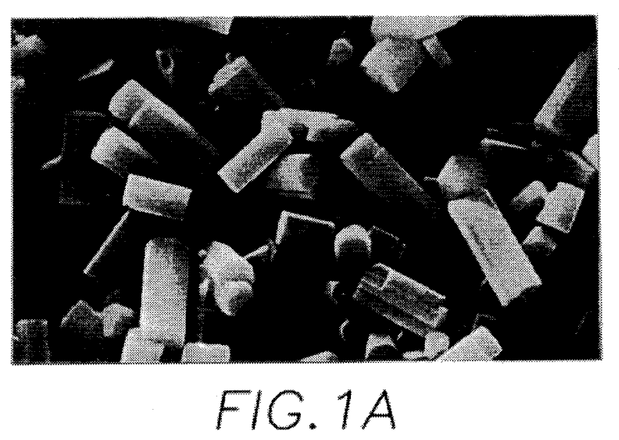
FIG. 1 shows scanning electron micrographs (SEMS) of zeolite crystals made in accordance with Examples 1–3 and Reference Example A.
Figure 1B:
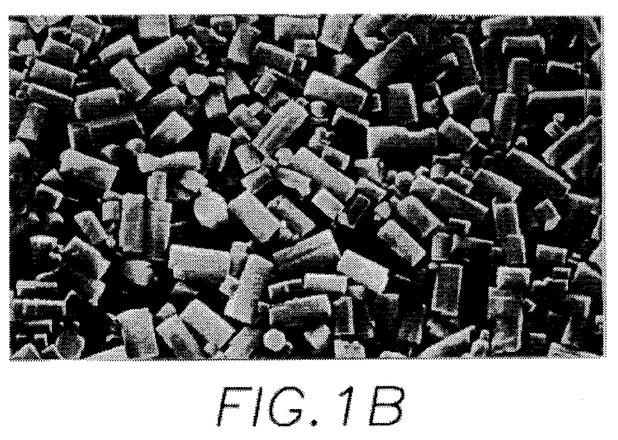
Figure 1C:
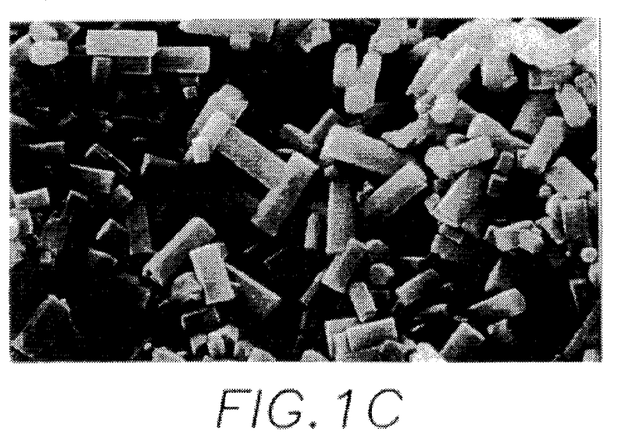
Figure 1D:
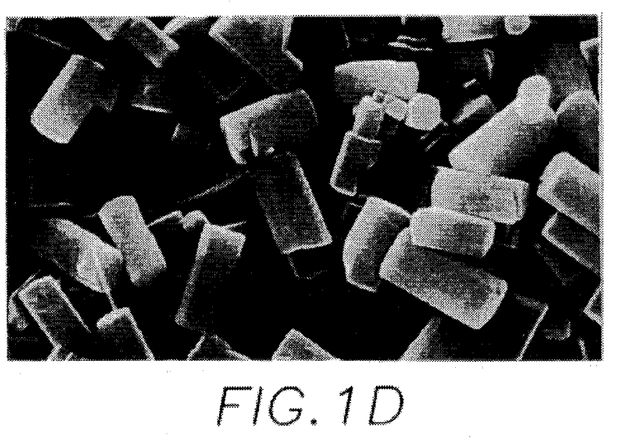
Figure 2A:
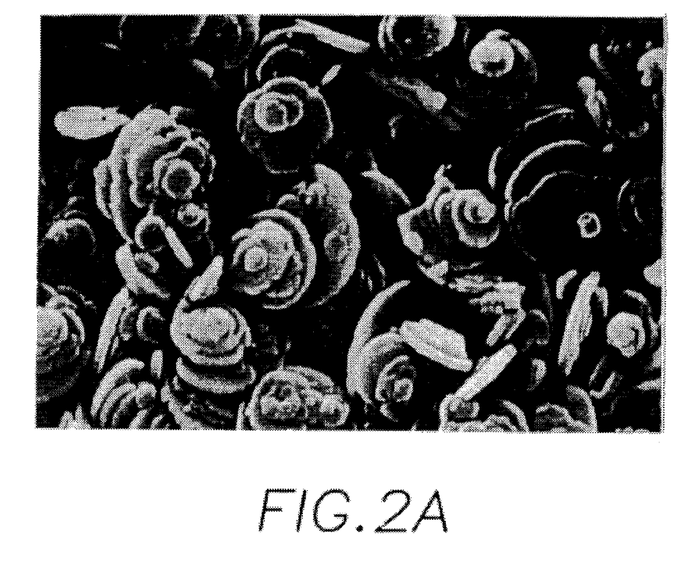
FIG. 2 shows SEMS of zeolite crystals made in accordance with Example 4 and Reference Examples B.
Figure 2B:
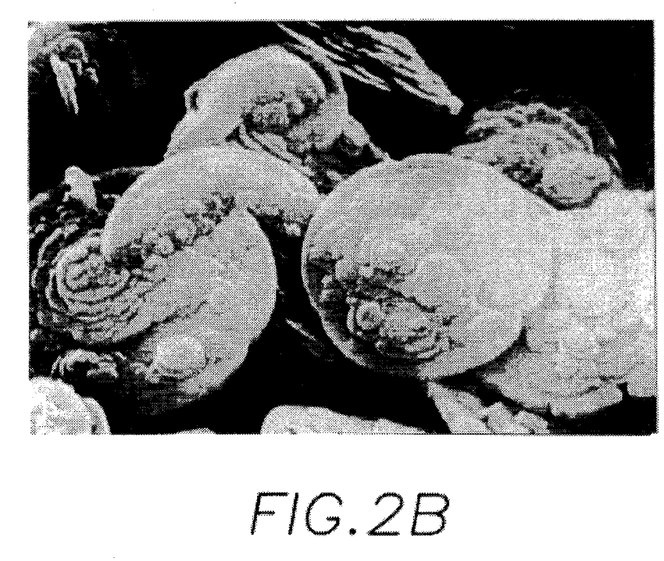

A synthesis mixture with, except for iron, the same molar composition as in Example 4 was crystallized in a 300 ml stainless steel autoclave for 78 hours at 150° C. XRD showed that the product was contaminated with zeolite erionite. SEM showed that the crystals were significantly larger than those obtained from Example 4. The crystallite dimensions were: length—0.4 microns, diameter 1.5–2.5 microns. Comparative SEM micrographs of the products of Example 4 and reference Example B are shown in FIG. 2.

It can be seen that the crystals of reference Example B are much larger and have much more "domed" surfaces than the flat plate let crystals of Example 4.

An overview of the synthesis and product characteristics of Examples 1 to 4 and Reference Examples A and B is shown in Table 1.

EXAMPLE 5

Effect of $Fe^{3+}$ in Hockeypuck KL synthesis.

A synthesis mixture was prepared using the following solutions, (weight of reactants is given in grams).

| SOLUTION A: | |
|---|---|
| KOH (86.8%) | 34.32 |
| Al (OH)$_3$ (98.6%) | 7.91 |
| H$_2$O | 50.03 |
| Rinse water | 25.09 |

| SOLUTION B: | |
|---|---|
| Ludox HS-40 | 150.28 |
| Fe(NO$_3$)$_3$.9H$_2$O | 2.4199 |
| H$_2$O | 25.30 |
| Rinse Water | 89.31 |

The $Fe^{3+}$ source was dissolved in a portion of the make up water (25.30 grams). This $Fe^{3+}$ solution was then mixed with the Ludox, together with the rise water. This solution, B, was mixed for 3 minutes in a household mixer. Next, the solution A was added and the whole was mixed for another 3 minutes.

Molar Composition:

2.65 K$_2$O/0.03 Fe$_2$O$_3$/0.50 Al$_2$O$_3$/10 SiO$_2$/160 H$_2$O.

327.73 grams of the gel was transferred to a 300 ml stainless steel autoclave. The autoclave was placed in an oven at room temperature and heated to 170° C. over a period of about 2 hours. The autoclave was kept at 170° C. for 96 hours.

The product was then washed and recovered. The product had a slightly yellow hue, indicating that it was not fully crystalline. It was washed with demineralised water until the pH of the last wash water was 10.7, and dried overnight at 150° C. Weight of product obtained: 30.9 grams. Product yield: 9.4%. The yield is calculated as:

$$\frac{\text{(weight of dried product)}}{\text{(weight of synthesis gel)}} \times 100\%$$

CHARACTERISATION

XRD: Zeolite KL, contaminated with traces of erionite/offretite. The diffractogram shows an amorphous halo indicating the presence of amorphous product.

XRD CRYSTALLINITY vs. STANDARD: 58%.

TGA TOLUENE ADSORPTION (P/Po=0.25, T=30° C.): 2.4.

SEM: Crystals are significantly smaller than a similar synthesis without the $Fe^{3+}$. The crystals have a hockeypuck morphology; amorphous material is also present.

EXAMPLE 6

Effect of a combination of $Fe^{3+}$ and $Mg^{2+}$ in hockeypuck KL synthesis.

The synthesis mixture was prepared using the following solutions: (weight of reactants is given in grams):

| SOLUTION A: | |
|---|---|
| KOH (86.8%) | 34.31 |
| Al(OH)$_3$ (98.6%) | 7.91 |
| H$_2$O | 50.01 |
| Rinse Water | 24.91 |

| SOLUTION B: | |
|---|---|
| Ludox HS-40 | 150.26 |
| Fe(NO$_3$)$_3$.9H$_2$O | 2.4201 |
| H$_2$O | 26.22 |
| Rinse Water | 53.02 |
| Mg$^{2+}$-stock solution* | 36.21 |

*1.0176 grams Mg(NO$_3$)$_2$.6H$_2$O/Kg Water.

The $Fe^{3+}$ source was dissolved in a portion of the make up water (26.22 grams). This $Fe^{3+}$ solution was added to the Ludox, together with the rinse water (the rinse water is used to rinse the beaker containing the $Fe^{3+}$ solution). This solution was homogenised by stirring for about 1 minute using a household mixer. Next the $Mg^{2+}$ solution was added and the whole was mixed for another 2 minutes. Solution A was added to the contents of the mixer and the whole was mixed for 3 minutes.

Molar Composition:

2.65 K$_2$O/0.03 Fe$_2$O$_3$/0.50 Al$_2$O$_3$/10 SiO$_2$/160 H$_2$O+9 ppm Mg$^{2+}$ 326.86 grams of the gel was transferred to a 300 ml stainless steel autoclave. The autoclave was placed in an oven at room temperature and heated to 170° C. over a period of about 2 hours. The autoclave was kept at 170° C. for 96 hours.

The product was washed and recovered. It had a whiter appearance than that of Example 5, indicating that the product of Example 6 was more crystalline. The product was washed with demineralised water until the last wash water had a pH of 10.3, and dried overnight at 150° C. Weight of product obtained: 28.6 grass. Product Yield: 8.7%.

CHARACTERISATION

XRD: Zeolite KL contaminated with traces of erionite/offretite. There was no amorphous halo in the diffractogram.

CRYSTALLINITY vs. STANDARD: 78%

TGA TOLUENE ADSORPTION (P/Po=0.25, T=30° C.): 5.7.

SEM: Crystallites are smaller than in Example 5.

A reference example was carried out (reference C) using the same gel composition as in Examples 5 and 6, but in which no iron or magnesium was added to the synthesis mixture. This synthesis mixture was heated, and the product washed and recovered under the same conditions as Examples 5 and 6. A summary of the synthesis and product characteristics of reference example C and Examples 5 and 6 is shown in Table 2.

Significant amounts of amorphous contaminants and erionite were present in the product of reference Example C. In Example 5 the product contained only trace amounts of erionite and the x-ray diffractograph showed a slight amorphous halo indicating the presence of a small amount of amorphous material. In the product of Example 6 there was no amorphous material present, and only trace amounts of erionite.

TABLE 1

OVERVIEW SYNTHESIS/PRODUCT CHARACTERISTICS

| | Composition synthesis mixture (moles/10 moles SiO$_2$) | | | | Crystallization | | Product Characteristics | | | | | | |
|---|---|---|---|---|---|---|---|---|---|---|---|---|---|
| | | | | | | | % cryst. | XRD | | SEM crystallite | | | TGA |
| Exp. # | K$_2$O | Fe$_2$O$_3$ | Al$_2$O$_3$ | H$_2$O | time hrs | temp °C. | vs standard | contaminants w/l ratio | other | length (microns) | diam. (microns) | Vd ratio | % toluene adsorption |
| 1. | 2.35 | 0.015 | 1 | 160 | 89 | 175 | 83 | 0.05 | nil | 2–4 | 1–2 | –2.1 | 7.0 |
| 2. | 2.35 | 0.030 | 1 | 160 | 85 | 175 | 89 | <0.01 | nil | 1–2.5 | 0.5–1 | –2.3 | 8.6 |
| 3. | 2.35 | 0.060 | 1 | 160 | 89 | 175 | 74 | 0.09 | nil | 1–3.5 | 0.5–1 | –3 | 7.5 |
| Ref A | 2.35 | — | 1 | 160 | 66 | 175 | 98 | 0.12 | nil | 3–5 | 1.5–2 | –2 | 8.3 |
| 4. | 3.20 | 0.060 | 0.25 | 160 | 120 | 150 | 70 | nil | nil | 0.05–0.2 | 0.5–1.0 | –0.2 | 9.1 |
| Ref B | 3.20 | — | 0.25 | 160 | 78 | 150 | 83 | nil | Eri | –0.4 | 1.5–2.5 | –0.2 | 5.5 |

TABLE 2

| Example | Type of Experiment | Gel Composition Moles | Crystallization Time Hrs | Temp °C. | XRD Xst* | Impurity | Product Characteristics SEM Cryst Lgth (μ) | Size Diam (μ) | Other |
|---|---|---|---|---|---|---|---|---|---|
| Ref C | No Fe$^{3+}$ | 2.65 K$_2$O/0.50 Al$_2$O$_3$/ 10 SiO$_2$/160 H$_2$O | 96 | 170 | 45 | amorph. + significant erionite | –1.5 | –4 | domed basal planes; amorph. |
| Ex. 5 | Fe$^{3+}$ added | 2.65 K$_2$O/0.03 Fe$_2$O$_3$/ 0.50 Al$_2$O$_3$/10 SiO$_2$/ 160 H$_2$O | 96 | 170 | 58 | amorph. + traces of erionite/off | –0.7 | –1.3 | flat basal planes; amorph. |
| Ex. 6 | Fe$^{3+}$ and Mg$^{2+}$ added | 2.65 K$_2$O/0.03 Fe$_2$O$_3$/ 0.50 Al$_2$O$_3$/10 SiO$_2$/ 160 H$_2$O + 9 wt ppm Mg$^{2+}$ | 96 | 170 | 78 | trace of erionite/off | –0.5 | –0.8 | flat basal planes |

Xst* = Crystallinity vs. Standard.

Figure 3:
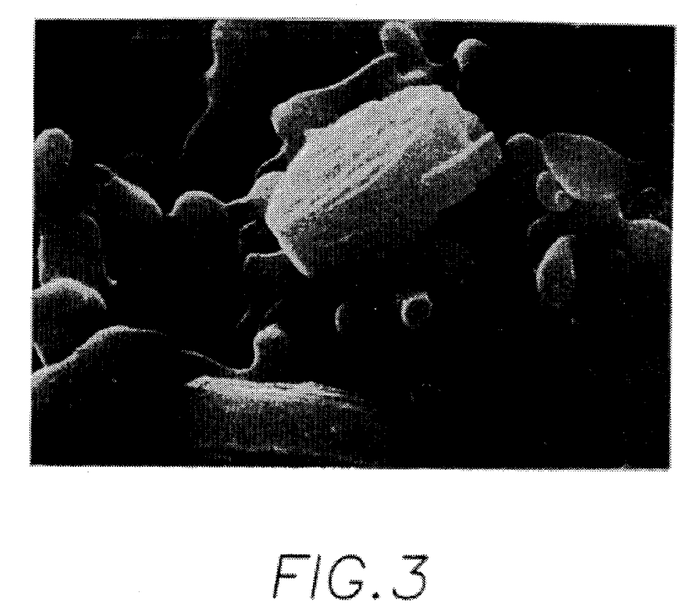
FIG. 3 shows an SEM of zeolite crystals made in accordance with Reference Example C.
Figure 4:
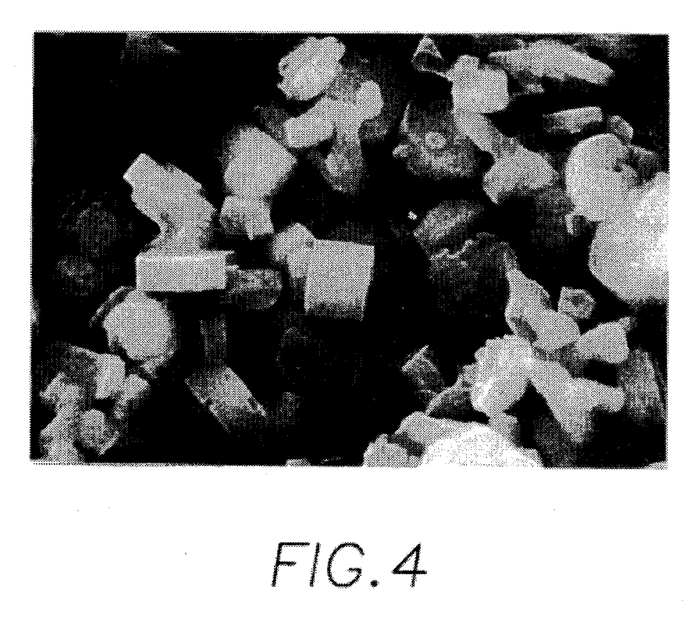
FIG. 4 shows an SEM of zeolite crystals made in accordance with Example 5.
Figure 5:
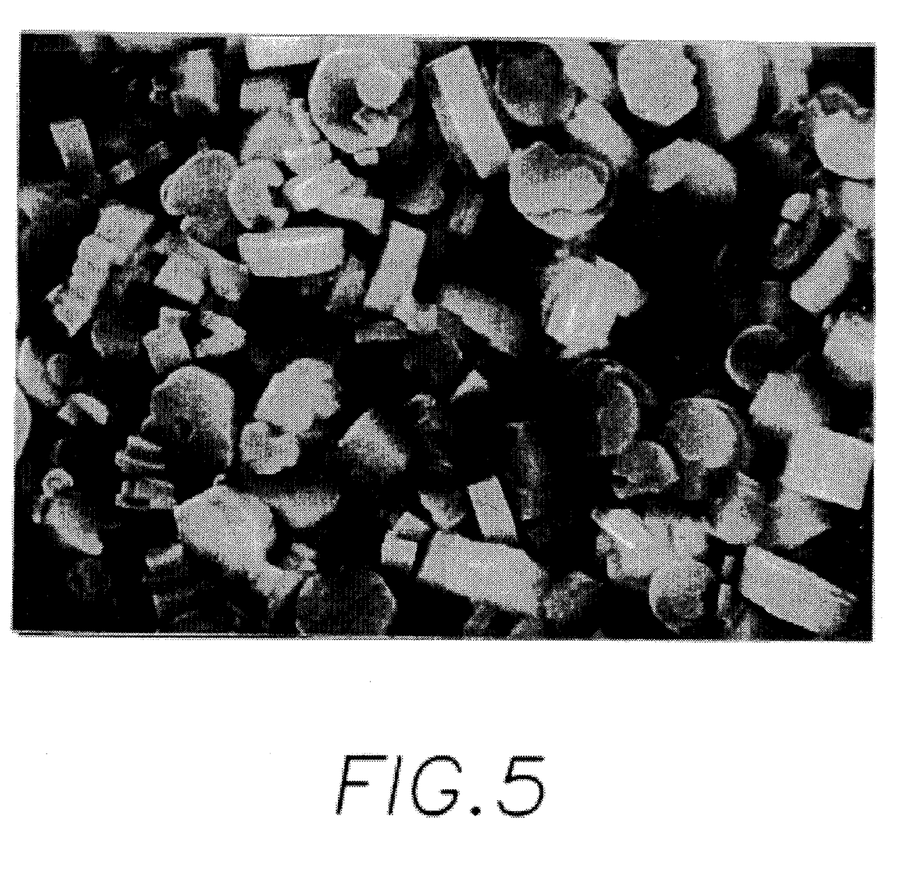
FIG. 5 shows an SEM of zeolite crystals made in accordance with Example 6.

SEM micrographs (magnification 10,000 times) of the products of reference examples C, Examples 5 and 6 are shown in FIGS. 3 and 4. The X-ray diffractographs in combination with these figures show that the presence of Fe$^{3+}$ suppresses contaminants such as erionite, increases the formation rate of KL and tends to flatten the basal surface of the crystals, when compared with a synthesis carried out without added Fe$^{3+}$. The additional presence of Mg$^{2+}$ is beneficial in that the hockeypuck product is more crystalline and has smaller crystals. The extra addition of Mg$^{2+}$ in the synthesis of cylindrical KL crystals has not been seen to produce a corresponding effect.

Examples 1, 2 and 5 of U.S. Pat. No. 4,698,322 (equivalent to EP-A--198720) were repeated to analyse the crystal morphology of the zeolites produced. The Examples were downscaled 2.5 times.

Preparation synthesis mixture (weight of reactants are given in grams:

| | | SAMPLE 1 |
|---|---|---|
| SOLUTION A: | KOH (87.5%) | 40.80 |
| | Al(OH)$_3$ (99.3%) | 18.80 |
| | H$_2$O | 55.03 |
| | Rinse Water | 25.00 |
| SOLUTION B: | Ludox HS 30 | 240.00 |
| | H$_2$O | 96.00 |
| | | SAMPLE 2 |
| SOLUTION A: | KOH (87.5%) | 40.80 |
| | Al(OH)$_3$ (99.3%) | 18.80 |
| | Fe(NO$_3$)$_3$.9H$_2$O | 0.373 |
| | H$_2$O | 55.01 |
| | Rinse Water | 24.99 |
| SOLUTION B: | Ludox HS 30 | 240.00 |
| | H$_2$O | 96.01 |
| | | SAMPLE 5 |
| SOLUTION A: | KOH (87.5%) | 40.80 |
| | Al(OH)$_3$ (99.3%) | 18.80 |
| | Fe(NO$_3$)$_3$.9H$_2$O | 0.760 |
| | H$_2$O | 55.01 |
| | Rinse Water | 25.23 |
| SOLUTION B: | Ludox HS 30 | 240.00 |
| | H$_2$O | 96.00 |

The ingredients forming solution A were heated to –90° C. When Fe$^{3+}$ was included the solution, the solution became orange-brown. The rinse water was used to quantitatively transfer the potassium/Fe$^{3+}$/aluminate solution to solution B. The combined solutions A and B were mixed for 3 minutes (mixtures started to gellate).

Composition synthesis mixtures (moles):

Sample 1: 2.66 $K_2O/Al_2O_3/10.0$ $SiO_2/165$ $H_2O$, wt ppm $Fe^{3+}$ added: nil Sample 2: 2.66 $K_2O/Al_2O_3/10.0$ $SiO_2/165$ $H_2O$, wt ppm $Fe^{3+}$ added: 114

Sample 5: 2.66 $K_2O/Al_2O_3/10.0$ $SiO_2/165$ $H_2O$, wt ppm $Fe^{3+}$ added: 220.

Composition synthesis mixtures according to U.S. Pat. No. 4,698,322.

Sample 1: 2.66 $K_2O/Al_2O_3/10.0$ $SiO_2/165$ $H_2O$,

Sample 2: 2.66 $K_2O/Al_2O_3/10.0$ $SiO_2/165$ $H_2O$+108 ppm $Fe^{3+}$

Sample 5: 2.66 $K_2O/Al_2O_3/10.0$ $SiO_2/165$ $H_2O$+221 ppm $Fe^{3+}$.

Weight of synthesis mixtures in autoclaves:
Sample 1: 332.55 g,
Sample 2: 332.38 g,
Sample 5: 331.71 g.

Crystallisation: The autoclaves were heated up from 32° C. (90° F.) to 150° C. (302° F.) within 8.5 hours (13.88° C./hr= 25° F./hr), and kept at 150° C. (302° F.) for 72 hours.

The synthesis magmas were cooled to room temperature. In all three cases the motherliquor was colorless while the product was white. The products were washed three times with ≠600 ml of water. The pH of the last wash water was:
Sample 1: 10.48,
Sample 2: 10.52,
Sample 5: 10.47.

The products were dried overnight at 125° C. Weight of product obtained:
Sample 1: 50.2 gr,
Sample 2: 50.3 gr,
Sample 5: 50.9 gr.

Product Yields:
SAMPLE 1: 15.1%,
SAMPLE 2: 15.1%,
SAMPLE 5: 15.3%.

Characterization: XRD shows that products are pure zeolite L and excellently crystalline.

Figure 6A:
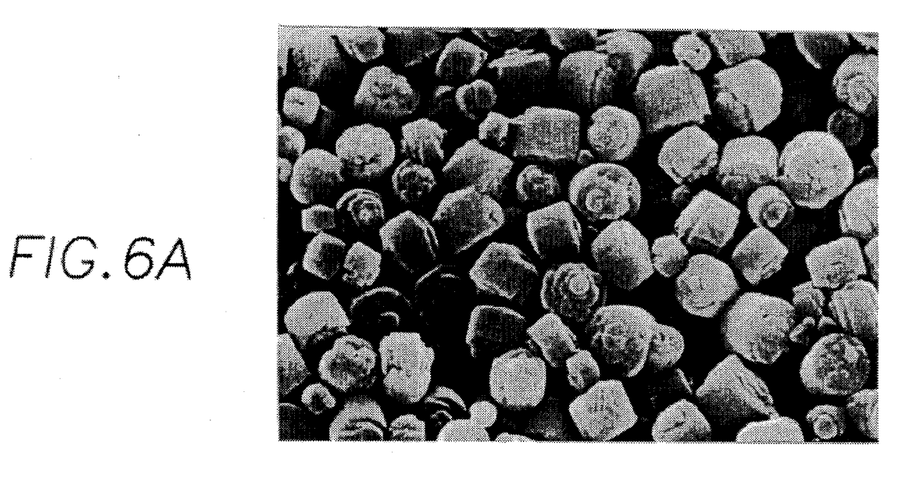
FIG. 6 shows SEMS of zeolite crystals made in accordance with the processes of prior art U.S. Pat. No. 4,690,322.
Figure 6B:
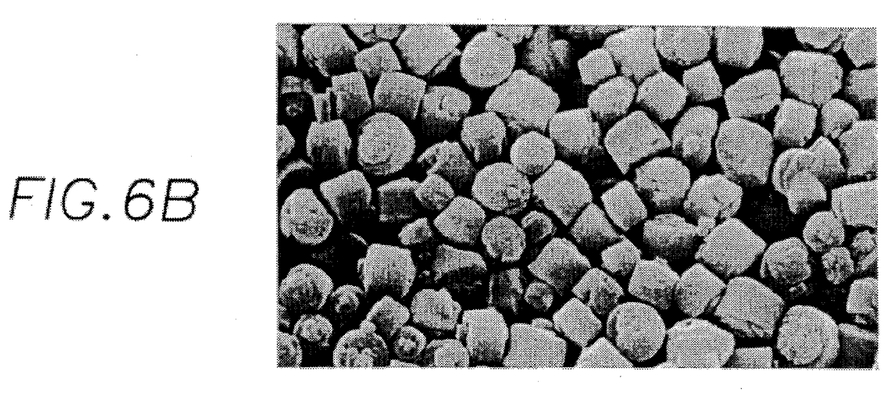
Figure 6C:
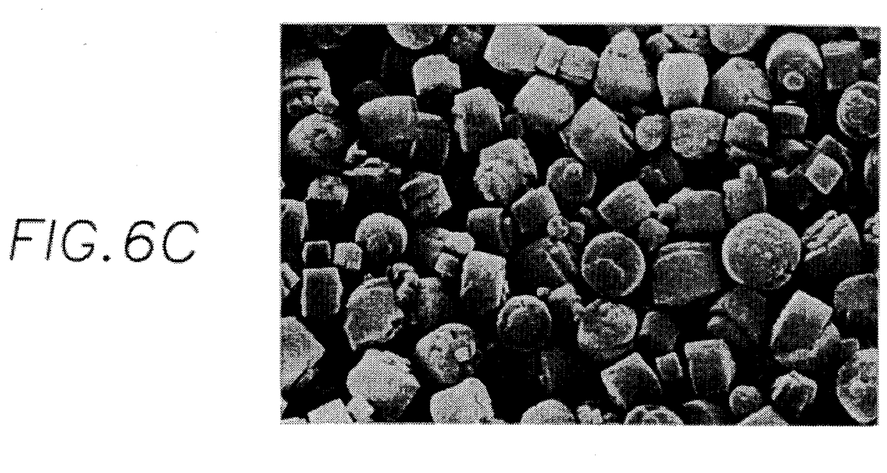

SEM micrographs (magnification 10,000 times) of samples 1, 2 and 5 are shown in FIG. 6. It can be seen from this that the addition of iron in the quantities described in U.S. Pat. No. 4,698,322 does not change the morphology of the zeolite crystals. The crystal size and shape is unchanged.

Fe-KL CATALYST

A sample of the zeolite obtained from Example 2 of the present invention was loaded with platinum, and used as an aromatisation catalyst. The results were compared with those obtained using a standard, commercial zeolite KL catalyst. In terms of selectively and stability, the Fe-containing zeolite KL was significantly better than the standard commercial KL.

A standard KL powder, designated LZ 27F1, in which the $SiO_2/Al_2O_3$ ratio is 5.8, and having an average crystallite length of 0.7 to 1.4 microns was compared with the KL powder of Example 2 in which iron had been added to the synthesis mixture. In the zeolite of Example 2 the $SiO_2/Al_2O_3$ ratio was 7.1 and the average crystallite length was 1 to 2.5 microns. Each KL powder was loaded with a nominal amount of platinum of 0.6 weight %.

The reactor was loaded using 1.0 gm catalyst (10/20 mesh) and 1.0 gm inert diluent (40/60 mesh) and a thermocouple placed axially and longitudinally in the centre of the catalyst bed.

The catalyst was pre-treated for 1 hour at 120° C. with nitrogen at a rate of 250 cm$^3$/min and 1 hour at 450° C. with hydrogen at a rate of 250 cm$^3$/min. The hydrocarbon feed was then introduced at 450° C. and the temperature ramped to 510 C. Guard beds of massive nickel followed by alumina were used.

The feed was a 60/40 mix of 3-methyl pentane/n-hexane. The reaction conditions were as follows:
Weight hourly space velocity (WHSV)=25.
Pressure=105 psig. (724 kPm)
$H_2$/Feed=4.25.
Temperature=510° C.

The results reported are the average of at least 2 independent runs.

Figure 7:
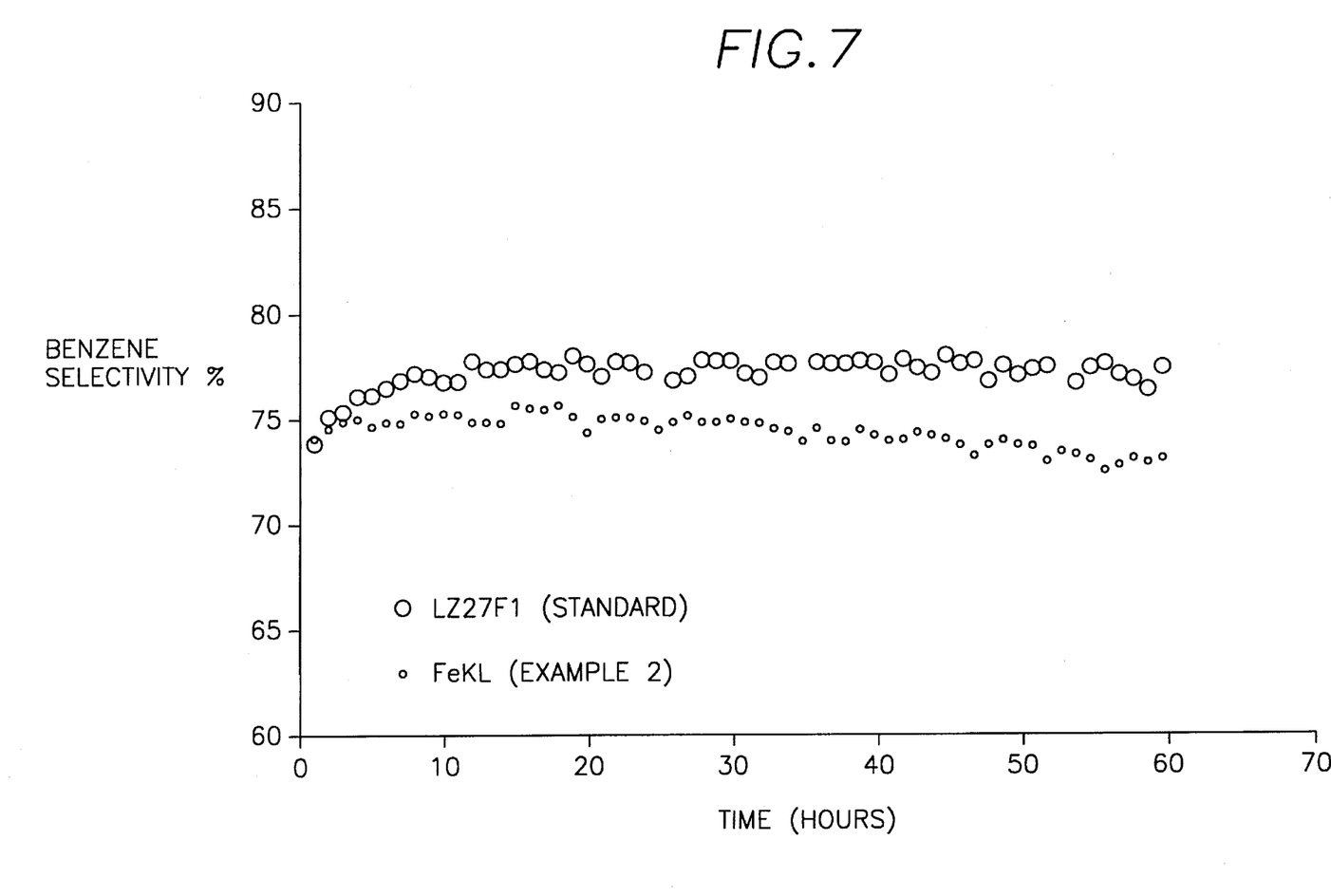
FIG. 7 is a graph plotting benzene selectively using the catalyst of Example 2 vs. a standard catalyst.

FIG. 7 shows the benzene selectivity of the catalyst based on the zeolite KL of Example 2 compared with the standard zeolite KL catalyst. It can be seen from this that the catalyst based on FeKL is consistently more selective than the catalyst which did not have iron added to the synthesis mixture.

Figure 8:
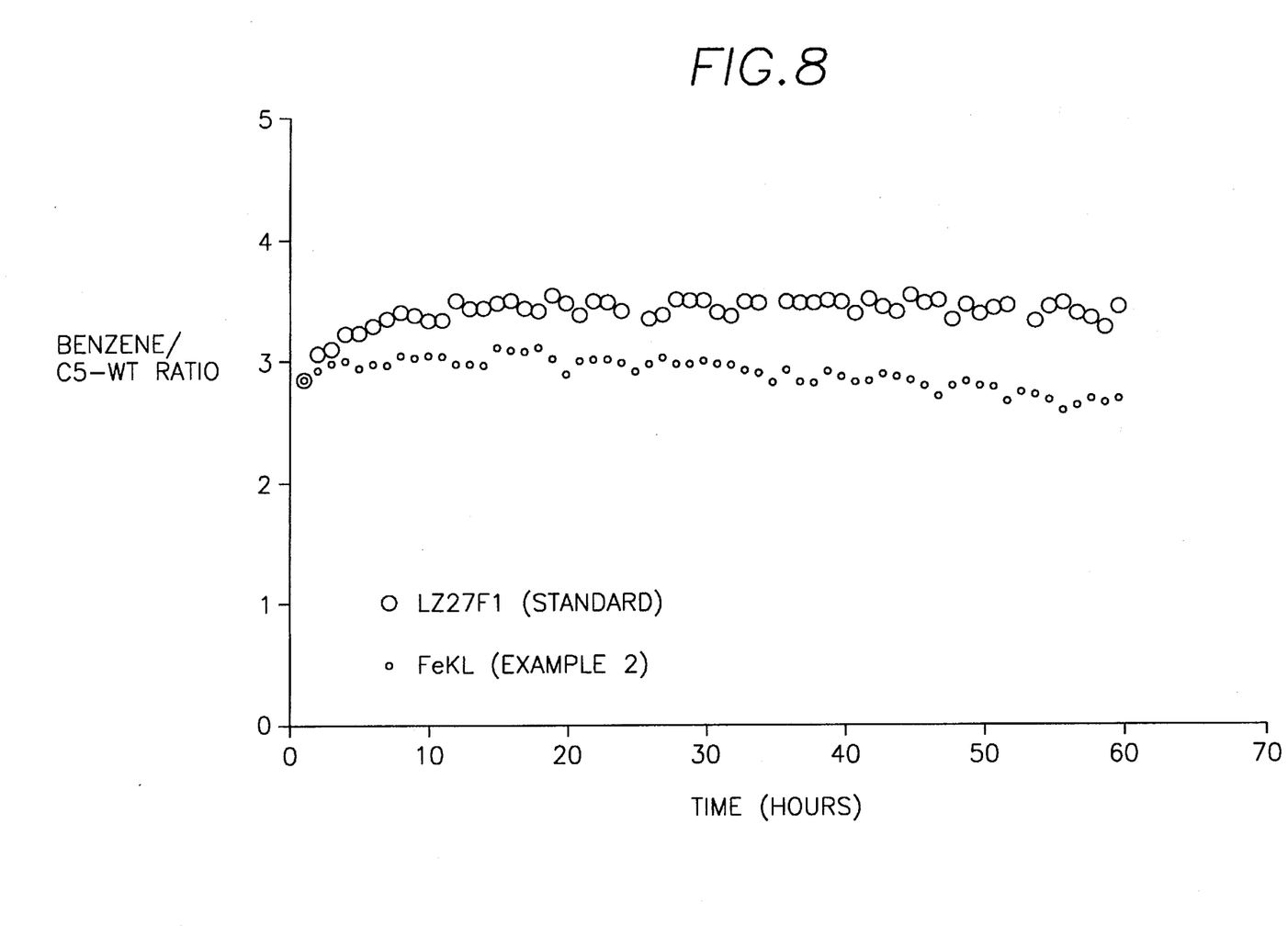
FIG. 8 is a graph plotting benzene/$c_5$ weight ratio produced using the catalyst of Example 2 vs. a standard catalyst.

FIG. 8 shows the benzene/$C_5$ weight ratio produced using the standard catalyst and the catalyst based on the zeolite of Example 2. Again the catalyst based on the zeolite of Example 2 produces a higher benzene/$C_5$ weight ratio than the standard catalyst over a long period of time, indicating a greater selectivity.

I claim:

1. An Fe-containing zeolite KL obtained by heating a synthesis mixture comprising a source of $K_2O$, a source of $SiO_2$, a source of $Al_2O_3$ and a source of $Fe^{3+}$, in which the $K_2O/SiO_2$ molar ratio is 0.18 to 0.36 and the $Fe_2O_3/Al_2O_3$ molar ratio is such that the average length of the zeolite crystals produced is not more than 80% of the average length of zeolite crystals produced by heating under the same conditions the corresponding synthesis mixture in the absence of iron, said zeolite further characterized in that the $Fe_2O_3/Al_2O_3$ molar ratio is at least 0.015 end up to 0.06 when the $SiO_2/Al_2O_3$ molar ratio in said synthesis mixture is less than 15 and the $Fe_2O_3/Al_2O_3$ molar ratio is greater than 0.06 and up to 0.3 when the $SiO_2/Al_2O_3$ molar ratio in said synthesis mixture is at least 15.

2. A zeolite KL according to claim 1 in which the $K_2O/SiO_2$ molar ratio of the synthesis mixture is 0.18 to 0.26 and the $SiO_2/Al_2O_3$ molar ratio of the synthesis mixture is 8 to less then 15.

3. A zeolite KL according to claim 1 in which the $Fe_2O_3/Al_2O_3$ molar ratio in the synthesis mixture is 0.03 to 0.06.

4. A zeolite KL according to claim 1 in which the $K_2O/SiO_2$ molar ratio in the synthesis mixture is 0.225 to 0.245.

5. A zeolite KL according to claim 4 in which the $Fe_2O_3/Al_2O_3$ molar ratio in the synthesis mixture is 0.03 to 0.06.

6. A zeolite KL according to claim 1 in which the $K_2O/SiO_2$ molar ratio of the synthesis mixture is 0.25 to 0.36, and the $SiO_2/Al_2O_3$ molar ratio of the synthesis mixture is 15 to 80.

7. A zeolite KL according to claim 6 in which the synthesis mixture further contains a source of divalent cation.

8. A zeolite KL according to claim 7 in which the divalent cation is $Mg^{2+}$, present in the synthesis mixture in an amount of 5 to 100 ppm.

9. A zeolite KL according to claim 6 wherein the $SiO_2/Al_2O_3$ molar ratio of the synthesis mixture is 20 to 40.

10. A zeolite KL according to claim 1 in which the synthesis mixture further contains a source of divalent cation.

11. A zeolite KL according to claim 10 in which the divalent cation is $Mg^{2+}$, present in the synthesis mixture in an amount of 5 to 100 ppm.

12. A process for producing an Fe-containing zeolite KL as claimed in claim 1 comprising:
  (i) forming an aqueous synthesis mixture comprising a source of $K_2O$, a source of $SiO_2$, a source of $Al_2O_3$ and a source of $Fe^{3+}$;
  (ii) heating the synthesis mixture to at least 150° C. for a time sufficient to crystallize it.

13. A process according to claim 12 in which the synthesis mixture is heated to 170° to 200° C. for at least 60 hours.

14. A process according to claim 12 in which the crystallized mixture is washed and dried.

15. The process according to claim 12 wherein, in the synthesis mixture, the $K_2O/SiO_2$ molar ratio is 0.18 to 0.26, and the $Fe_2O_3/Al_2O_3$ molar is 0.03 to 0.06.

16. The process according to claim 12 wherein, in the synthesis mixture, the $K_2O/SiO_2$ molar ratio is 0.25 to 0.36 and the $Fe_2O_3/Al_2O_3$ molar ratio is greater than 0.06 up to 0.3.

17. A reforming catalyst comprising a zeolite produced by the process as claimed in claim 12 on which has been loaded platinum, or a mixture of platinum and one or more other metal.

18. A process of reforming a hydrocarbon comprising contacting the hydrocarbon with a reforming catalyst as claimed in claim 17.

19. A reforming catalyst comprising a zeolite as claimed in claim 1 on which has been loaded platinum, or a mixture of platinum and one or more other metal.

20. A process of reforming a hydrocarbon comprising contacting the hydrocarbon with a reforming catalyst as claimed in claim 19.

21. A method of using a source $Fe^{3+}$ to reduce the average crystal length of a zeolite comprising including the $Fe^{3+}$ source in a synthesis mixture for the zeolite comprising a source of $K_2O$, a source of $SiO_2$ and a source of $Al_2O_3$, the $K_2O/SiO_2$ molar ratio being 0.18 to 0.36 and the $Fe_2O_3/Al_2O_2$ molar ratio being 0.015 to 0.3.

22. The method according to claim 21 in which a source of divalent cation is also included in the synthesis mixture.

23. The method according to claim 22 in which the divalent cation is $Mg^{2+}$ and is included in an amount of 5 to 100 ppm.

* * * * *